United States Patent [19]

Gerdau et al.

[11] Patent Number: 5,075,266

[45] Date of Patent: Dec. 24, 1991

[54] PROCESS FOR THE PRODUCTION OF CERAMIC MATERIAL CONTAINING SILICON NITRIDE FROM POLYMERIC HYDRIDOCHLOROSILAZANES

[75] Inventors: Thomas Gerdau, Eppstein/Taunus; Hans-Jerg Kleiner, Kronberg/Taunus; Martin Brück; Marcellus Peuckert, Hofheim am Taunus; Fritz Aldinger, Rodenbach, all of Fed. Rep. of Germany

[73] Assignee: Hoechst Aktiengesellschaft, Frankfurt am Main, Fed. Rep. of Germany

[21] Appl. No.: 381,501

[22] Filed: Jul. 18, 1989

[30] Foreign Application Priority Data

Jul. 20, 1988 [DE] Fed. Rep. of Germany ....... 3824614

[51] Int. Cl.$^5$ .............................................. C04B 35/58
[52] U.S. Cl. ......................................... 501/97; 264/65; 501/95; 501/96; 525/474
[58] Field of Search .................. 501/90, 92, 96, 98, 501/87, 95; 35/58; 264/65; 525/474

[56] References Cited

U.S. PATENT DOCUMENTS

| 3,853,567 | 12/1974 | Verbeek | 501/92 |
| 3,892,583 | 7/1975 | Winter et al. | 501/92 |
| 4,535,007 | 8/1985 | Cannady | 427/226 |
| 4,743,662 | 5/1988 | Lipowitz | 501/87 |
| 4,757,035 | 7/1988 | Baney et al. | 501/92 |
| 4,771,118 | 9/1988 | Takamizawa et al. | 501/92 |
| 4,833,107 | 5/1989 | Kaya et al. | 501/96 |

FOREIGN PATENT DOCUMENTS

| 65687/86 | 4/1987 | Australia . | |
| 0235486 | 9/1987 | European Pat. Off. . | |
| 0250073 | 12/1987 | European Pat. Off. | 35/38 |
| 0266918 | 5/1988 | European Pat. Off. . | |
| 0276334 | 8/1988 | European Pat. Off. | 35/580 |
| 0305759 | 3/1989 | European Pat. Off. | 35/580 |
| 2583744 | 12/1986 | France | 35/580 |

OTHER PUBLICATIONS

R. R. Wills et al., Ceramic Bulletin 62:904-915 (1983).
World Patent Index Latest Database, Nr. 87-287383, 1987.

*Primary Examiner*—William R. Dixon, Jr.
*Assistant Examiner*—Paul Marcantoni
*Attorney, Agent, or Firm*—Connolly & Hutz

[57] ABSTRACT

The invention relates to a process for the production of ceramic material containing silicon nitride, such as fibers, coatings or moldings. In this process, polymeric hydridochlorosilazanes are rendered infusible at a temperature below their softening point by treatment with gaseous $NH_3$ and are then pyrolyzed in an atmosphere containing $NH_3$ at 700° to 1500° C. Fibers, coatings or moldings containing silicon nitride are produced by first producing appropriate structures from a melt of the polymeric hydridochlorosilazane and then rendering them infusible and pyrolyzing them.

10 Claims, No Drawings

PROCESS FOR THE PRODUCTION OF CERAMIC MATERIAL CONTAINING SILICON NITRIDE FROM POLYMERIC HYDRIDOCHLOROSILAZANES

DESCRIPTION

The outstanding properties of silicon nitride, $Si_3N_4$—mechanical strength, hardness and resistance to corrosion, oxidation and thermal shock-make ceramic material containing silicon nitride an interesting material of considerable commercial importance.

However, these same beneficial properties also make molding more difficult, so ceramic moldings, such as cutting tools, can only be produced at great expense by means of powder technology, i.e. using $Si_3N_4$ powder. In practice, it is not possible at all to produce special forms, such as thin layers and ceramic fibers, by means of powder technology. It is known that the pyrolysis of soluble or fusible polysilazanes in an inert atmosphere ($N_2$ or argon) yields a ceramic material containing silicon nitride, so this route represents a promising alternative to the production of such workpieces by means of powder technology (R. R. Wills et al., Ceramic Bulletin, vol. 62 (1983), 904–915).

It has also been proposed to carry out the pyrolysis of polysilazanes in $NH_3$ because a very pure, carbon-free $Si_3N_4$ is formed in this case (European patent document A2-250073).

Now, molding can already take place at the polysilazane stage, i.e. at the stage of the "preceramic polymer", the latter either being dissolved in a solvent or melted and then converted to the desired shape. A main disadvantage of processing from the melt, however, is that the molding produced must first be rendered infusible by reaction with a reactive gas such as $HSiCl_3$ (U.S. Pat. No. 4,535,007) or with steam (U.S. Pat. No. 3,853,567) in order to prevent it from melting again during the following pyrolysis. German patent applications P 37 33 727.0 and P 37 33 729.9 describe the preparation of polymeric hydridochlorosilazanes which are then dissolved in an organic solvent and reacted with liquid or gaseous $NH_3$ to give polyhydridosilazanes ("ammonolysis"). These can be converted by pyrolysis in an $NH_3$ atmosphere to a practically C-free ceramic material containing silicon nitride. It has now been found, surprisingly, that the direct pyrolysis of the said polymeric hydridochlorosilazanes (without prior conversion to chlorine-free polyhydridosilazanes according to P 37 33 729.9) in an atmosphere containing $NH_3$ also gives a ceramic, composed essentially of silicon nitride, which is not only practically carbon-free but is also extensively chlorine-free. The polymeric hydridochlorosilazanes become infusible as a result of this treatment with $NH_3$. Thus the present invention relates to a process by which fusible polymeric hydridochlorosilazanes can be pyrolyzed to an extensively chlorine-free and carbon-free ceramic material containing silicon nitride, without the articles formed from the polymeric hydridochlorosilazanes, such as fibers, layers or monolithic workpieces, melting during pyrolysis.

The present invention relates to a process for the production of ceramic material containing silicon nitride, wherein polymeric hydridochlorosilazanes of the formula

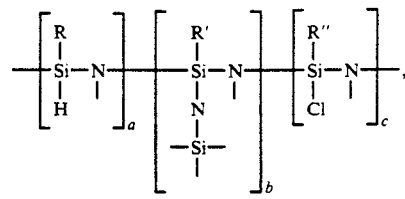

in which the free valencies of the nitrogen atoms are saturated with H atoms or silyl radicals $R^*SiX-N<$ ($X=H, Cl, N<$) and in which R, R', R'' and $R^*$ are alkyl groups having 1 to 6 C atoms and a, b and c are the mol fractions of the respective structural units, are rendered infusible at a temperature below the softening point of the polymeric hydridochlorosilazanes by treatment with gaseous $NH_3$ and are then pyrolyzed in an atmosphere containing $NH_3$ at temperatures of 700° to 1500° C.

R, R', R'' and $R^*$ are preferably alkyl groups having 1 to 3 C atoms. It is especially preferred if $R=R'=R''=R^*=CH_3$.

A possible embodiment consists in heating the polymeric hydridochlorosilazane in an atmosphere containing $NH_3$ from a temperature below the softening point up to the chosen pyrolysis temperature. In this process, the polymer is rendered infusible when heating starts and is then pyrolyzed direct.

A further possibility, however, is first to render the polymer infusible and then to pyrolyze it in a subsequent step.

At pyrolysis temperatures below 1200° C., amorphous materials are formed, whereas at pyrolysis temperatures in the range from 1200° to 1500° C., microcrystalline to crystalline ceramic materials are formed which contain $\alpha$-$Si_3N_4$ as the crystalline phase.

The polymeric hydridochlorosilazanes used as starting materials can be obtained by reacting oligohydridoalkylsilazanes of the general formula $(R^1SiHNH)_n$, in which n is about 3 to 12 and $R^1$ is an alkyl group having 1 to 6 C atoms, with a dichlorohydridoalkylsilane of the general formula $R^2SiHCl_2$, in which $R^2$ is an alkyl group having 1 to 6 C atoms, at 30° to 300° C. Readily volatile byproducts are formed and these are removed during the reaction.

The oligohydridoalkylsilazanes $(R^1SiHNH)_n$ which have just been mentioned can in turn be obtained by reacting a dichlorohydridoalkylsilane of the formula $R^1SiHCl_2$, in which $R^1$ is as defined above, with excess $NH_3$ in a solvent, as described in U.S. Pat. No. 4,482,669 (see columns 4, 5, 7 and 8 in particular). This reaction generally yields a mixture of linear and cyclic oligomers of different chain lengths n.

The radicals $R^1$ and $R^2$ in the oligohydridoalkylsilazanes $(R^1SiHNH)_n$ (also abbreviated to "oligosilazanes" hereafter) and in the dichlorohydridoalkylsilane $R^2SiHCl_2$ (also abbreviated to "dichloroalkylsilane" hereafter) can be identical or different and they preferably have 1 to 3 C atoms.

It is especially preferred if $R^1=R^2=CH_3$. The molar ratio of the reactants (in the above reaction to give the polymeric hydridochlorosilazane)—dichloroalkylsilane: $R^1SiHNH$ unit of the oligosilazane—is preferably about 0.2:1 to 1.5:1, in particular 0.3:1 to 1:1.

The preferred procedure for forming the polymeric hydridochlorosilazanes is to introduce the oligosilazanes first and add the dichloroalkylsilane. As the reaction is exothermic, the temperature is preferably kept at 30° to 50° C. when the reactants are first brought into contact. The mixture is then heated to temperatures of 100° to 300° C., preferably 120° to 250° C.

The volatile components formed as by-products in the preparation of the polymeric hydridochlorosilazanes, such as $RSiHCl_2$, $RSiClH_2$, $RSiCl_3$, HCl, $H_2$ and $NH_3$ (in which $R = R^1$ or $R^2$), escape to some extent during the reaction. When the reaction is complete, the residual volatile components are generally removed from the reaction vessel by the application of a vacuum.

The $NH_4Cl$ which is also formed in this reaction largely sublimes out of the reaction mixture in the course of the reaction. Any $NH_4Cl$ residue which may remain can be separated from the polymeric hydridochlorosilazane by extraction with an inert organic solvent such as n-hexane, toluene or ether.

The reaction time depends on the heating rate and the reaction temperature. A reaction time of 5 to 7 hours is generally sufficient.

It is also possible to prepare the polymeric hydridochlorosilazanes in an organic solvent. Suitable solvents are those which have inert behavior towards the reactants and a sufficiently high boiling point, e.g. saturated aliphatic or aromatic hydrocarbons such as n-decane, decalin, xylene and toluene, chlorinated hydrocarbons such as chlorobenzene, or ethers such as dibenzyl ether and diethylene glycol diethyl ether. By using a solvent in which the $NH_4Cl$ formed is insoluble, the latter can be separated off by filtration. The polymeric hydridochlorosilazanes are then obtained by distillation of the solvent under reduced pressure.

If desired, the process can also be carried under reduced pressure or at pressures in the range from 1 to 10 atmospheres.

The polymeric hydridochlorosilazanes can also be prepared by a continuous process.

The polymeric hydridochlorosilazanes used as starting materials for the ceramic material containing silicon nitride have a molecular structure which can be represented by the formula

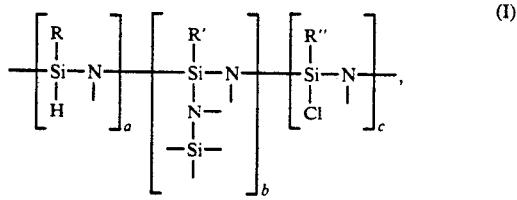

in which the free valencies on the nitrogen atoms are saturated with H atoms or silyl radicals $R*SiX-N< (X = H, Cl$ or $N<)$, R, R', R" and R* are alkyl groups having 1 to 6, preferably 1 to 3 C atoms and a, b and c are the mol fractions of the respective structural units. $a + b + c = 1$. It is especially preferred if $R = R' = R" = R* = CH_3$. The polymeric hydridochlorosilazanes have a reticular structure.

The values of the mol fractions b and c are the higher (and, accordingly, the value of a is the lower) the higher the ratio dichloroalkylsilane:$R^1SiHNH$ unit of the oligosilazane. The values of a, b and c in each particular case can be determined by integration of the $^1H$ NMR spectra and by elemental analysis. In general, the values of a, b and c are 0.1 to 0.8, where $a + b + c = 1$. Preferred polymeric hydridochlorosilazanes are those in which the values of a and b are 0.1 to 0.5, in particular 0.2 to 0.4. The preferred values of c are 0.1 to 0.6, in particular 0.3 to 0.6. As already stated, these values can be adjusted via the relative proportion of dichloroalkylsilane in the reaction mixture and monitored by the said analytical methods. The preferred values of a, b and c which have just been mentioned have proved particularly satisfactory when a fiber is to be produced as the end product of pyrolysis (after conversion of the polymeric hydridochlorosilazanes to polyhydridosilazanes).

By virtue of their physical and chemical properties, the polymeric hydridochlorosilazanes are outstanding starting materials for the production of preceramic moldings.

They are soluble in organic solvents, for example, and form melts which are stable enough to allow the application of a whole variety of molding processes; in particular, they form clear void-free melts, so continuous faultless fibers can be spun from these melts.

Fibers can be obtained for example by spinning a melt of the polymeric hydridochlorosilazane through a spinneret which preferably has a diameter of about 80 to 200 $\mu$m. Subsequent stretching tapers the fiber, giving a very strong fiber of 2 to 20 $\mu$m in diameter after pyrolysis. The temperature of the spinning melt is generally 100° to 200° C. The resulting polymer fibers are then exposed to an atmosphere containing $NH_3$ before being pyrolyzed in a reducing atmosphere such as ammonia, hydrogen or mixtures thereof with inert gases such as nitrogen or noble gases.

The fibers produced by pyrolysis are used as mechanical reinforcing inclusions in fiber-reinforced aluminum, aluminum alloys and ceramic structural components.

Another important way in which the polymeric hydridochlorosilazanes can be utilized is in the production of dense, strongly adhering, amorphous or microcrystalline ceramic coatings on metals or ceramics such as $Al_2O_3$, $ZrO_2$, MgO, SiC or $Si_3N_4$. The coating is applied e.g. by dipping the article to be coated into a melt of the polymeric hydridochlorosilazane at 100°-200° C. The spinning or coating melt is preferably prepared under a blanket of inert gas.

On account of their outstanding adhesion, high hardness and surface quality, the ceramic coatings are particularly suitable for improving the surface of machine parts subject to mechanical and chemical stress.

Of course, fibers and coatings can also be produced using solutions of the polymeric hydridochlorosilazanes in organic solvents such as ethers and optionally chlorinated aliphatic and aromatic hydrocarbons.

In this process, fibers can be drawn from high-viscosity solutions of the polymeric hydridochlorosilazane in solvents such as toluene, THF or hexane. Again the fibers are advantageously drawn by means of spinnerets of 80 to 150 $\mu$m in diameter, the filament again being tapered by subsequent stretching to give a very strong filament of 2 to 20 $\mu$m, especially 5 to 15 $\mu$m in diameter after pyrolysis. Following extensive vaporization of the solvent, the filament is then rendered infusible and pyrolyzed, as described above in the case of the fibers spun from the melt.

Coating can also be carried out using a solution of the polymeric hydridochlorosilazane in organic solvents such as toluene, THF or hexane. Following extensive vaporization of the solvent, the coating is then rendered infusible and pyrolyzed, as described above in the case of the fibers spun from the melt.

Thus the method by which the polymer is rendered infusible and converted by pyrolysis to amorphous or microcrystalline material is the same as that described above, irrespective of whether the end products are three-dimensional moldings or fibers or coatings obtained from melts or solutions.

EXAMPLE 1

(a)

Preparation of oligohydridomethylsilazane, $(CH_3SiHNH)_n$ 100 ml (0.97 mol) of methyldichlorosilane were dissolved in 800 ml of absolute THF and ammonia was passed into the solution for 3 hours (rate of introduction: 0.5 l/min). The reaction temperature was kept in the range from 20° to 25° C. by cooling with an ice bath. The reaction was brought to completion by stirring for 1 hour at room temperature and the ammonium chloride was then separated off under argon. The precipitate was washed with twice 350 ml of THF and the combined THF solutions were concentrated under reduced pressure, giving a clear, readily mobile oil of $(CH_3SiHNH)_n$ in a yield of 44.5 g=78% of theory.

(b)

Preparation of the polymeric hydridochlorosilazane 108.8 g (1.84 mol) of oligohydridomethylsilazane were treated with 176.1 g (1.53 mol) of methyldichlorosilane at 30° to 45° C. and the mixture was heated to 200° C. over 7 hours in an oil bath, during which time the internal temperature rose from 46° C. to 164° C. A vigorous evolution of gas started above 100° C. After the reaction had ended and the mixture had cooled, a brittle resin was obtained. The total contents of the reaction flask amounted to 134 g. The resin was extracted with 500 ml of THF, the residue was then washed with 50 ml of n-hexane and the organic solvents were stripped off under vacuum. The residue consisted of 109 g of a white powder of the chemical composition $C_1H_{3.62}Cl_{0.38}N_{0.8}Si_1$.

| Elemental analysis (% by weight): | | | | | |
|---|---|---|---|---|---|
| | % Cl | % Si | % N | % C | % H |
| found: | 19.1 | 39.8 | 16.2 | 16.5 | 6.8 |
| calculated: | 19.7 | 41.0 | 16.4 | 17.6 | 5.3 |

Molecular weight: 1865 g/mol, determined by osmometry in benzene $^1H$ NMR (100 MHz, $CDCl_3$, ppm): $\delta=0.2-0.8$ (br, 3H, $SiCH_3$), 1.5–1.9 (br, 0.1H, NH), 4.5 (br), 4.7–5.0 (br) and 5.1 (br, 0.4H, SiH).

IR (KBr, $cm^{-1}$): 3380 (sh), 3150 (br, vs), 3050 (s), 2840 (w), 2160 (s), 1410 (vs), 1270 (vs), 1200–950 (br), 900 (br, vs), 760 (br, s).

(c)

Production of fibers from polymeric hydridochlorosilazane 20 g of the polymeric hydridochlorosilazane were introduced into a melt spinning apparatus under a blanket of $N_2$ gas and heated to 140° C. and the melt was compressed through a spinneret of diameter 0.7 mm by means of a plunger. The spun fiber was stretched under its own weight to a thickness of 20 μm.

(d)

Pyrolysis at 1200° C.

The resulting fibers were treated with $NH_3$ gas at room temperature to render them infusible and they were then pyrolyzed in a furnace under an $NH_3$ atmosphere. This was done by raising the temperature from 25° C. to 1200° C. over 7 hours, holding it at 1200° C. for 1 hour and then lowering it to room temperature again over 4 hours. The resulting fiber was amorphous to X-rays and contained 0.1% of C, 0.6% of Cl and 2.0% of O as main constituents in addition to Si and N. The ceramic yield of the pyrolysis was 64% by weight. The tensile strength of the fiber was 2 GPa.

EXAMPLE 2

Pyrolysis at 1300° C.

The procedure was the same as in Example 1(a) to 1(c). After this, however, pyrolysis was carried out at 1300° C. instead of 1200° C.

The polymer fiber was rendered infusible by treatment with $NH_3$ at 25° C. and then heated to 1300° C. over 7 hours under an $NH_3$ atmosphere and pyrolyzed for 1 hour at this temperature, after which the temperature was slowly lowered to room temperature over 5 hours. According to X-ray diffraction analysis, the resulting fiber consisted partly of crystalline $\alpha$-$Si_3N_4$ in addition to amorphous material. Chemical analysis showed 0.1% of C, 1.1% of Cl and 1.3% by weight of O as main constituents in addition to Si and N. The tensile strength of the fiber was 2.2 GPa.

What is claimed is:

1. A process for the production of ceramic material containing silicon nitride, wherein polymeric hydridochlorosilazanes of the formula

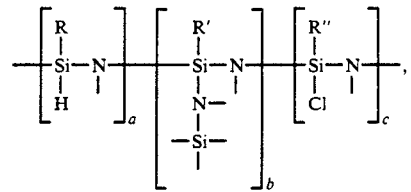

in which the free valencies of the nitrogen atoms are saturated with H atoms or silyl radicals $R^*SiX-N<(X=H, Cl, N<)$ and in which R, R′, R″ and $R^*$ are alkyl groups having 1 to 6 C atoms and a, b and c are the mol fractions of the respective structural units, are rendered infusible at a temperature below the softening point of the polymeric hydridochlorosilazanes by treatment with gaseous $NH_3$ and are then pyrolyzed in an atmosphere containing $NH_3$ at temperatures of 700° to 1500° C.

2. The process according to claim 1, wherein R, R′, R″ and $R^*$ are alkyl groups having 1 to 3 C atoms.

3. The process according to claim 1, wherein $R=R'=R''=R^*=CH_3$.

4. The process according to claim 1, wherein the polymer is pyrolyzed at temperatures of 800° to 1200° C.

5. The process according to claim 1, wherein the polymer is pyrolyzed at temperatures of 1300° to 1500° C.

6. The process according to claim 1, wherein ceramic fibers containing silicon nitride are produced by first melting the polymeric hydridochlorosilane under inert gas, spinning the melt through a spinneret to form a fiber and then rendering the fiber infusible and pyrolyzing it.

7. The process according to claim 6, wherein the fiber is stretched to diameters of 2-20 μm before it is rendered infusible and pyrolyzed.

8. The process according to claim 1, wherein ceramic coatings containing silicon nitride are produced by first melting the polymeric hydridochlorosilazane under inert gas, applying the coating with the melt and then rendering the coating infusible and pyrolyzing it.

9. The process according to claim 1, wherein ceramic moldings containing silicon nitride are produced by first melting the polymeric hydridochlorosilazane under inert gas, pouring the melt into a mold and then rendering the resulting molding infusible and pyrolyzing it.

10. The process according to claim 1, wherein ceramic fibers or coatings containing silicon nitride are produced by using a solution of the polymeric hydridochlorosilazanes in an organic solvent and, after extensive vaporization of the solvent, rendering the resulting fiber or coating infusible and pyrolyzing it.

* * * * *